United States Patent [19]

Grosso

[11] Patent Number: 5,118,954
[45] Date of Patent: Jun. 2, 1992

[54] METHOD AND DEVICE FOR THE GEOMETRICAL CHARACTERIZATION OF TRANSPARENT TUBES

[75] Inventor: Philippe Grosso, Lannion, France

[73] Assignee: French State Represented by the Minister of Post, Telecommunications and Space, Issy Les Moulineaux, France

[21] Appl. No.: 571,868

[22] Filed: Aug. 24, 1990

[30] Foreign Application Priority Data

Aug. 25, 1989 [FR] France .................. 89 11257

[51] Int. Cl.⁵ .......................................... G01N 21/86
[52] U.S. Cl. .................................. 250/560; 356/73.1; 356/386
[58] Field of Search ............... 250/560, 235, 236; 356/384-387, 73.1, 382

[56] References Cited

U.S. PATENT DOCUMENTS

| | | | |
|---|---|---|---|
| 3,027,457 | 3/1962 | Mouly | 250/83.3 |
| 4,027,977 | 6/1977 | Frazee, Jr. et al. | 356/73.1 |
| 4,042,723 | 8/1977 | Presby | 356/73.1 |
| 4,124,728 | 11/1978 | Marcuse et al. | 356/73.1 |
| 4,208,126 | 6/1980 | Cheo et al. | 356/73.1 |
| 4,227,806 | 10/1980 | Watkins | 356/73.1 |
| 4,269,514 | 5/1981 | Vossberg | 356/387 |
| 4,441,811 | 4/1984 | Melezoglu et al. | 356/73.1 |
| 4,638,168 | 1/1987 | Marino et al. | 356/73.1 |
| 4,648,718 | 3/1987 | Sadamitsu et al. | 356/387 |
| 4,859,861 | 8/1989 | Mersch | 250/560 |
| 4,994,677 | 2/1991 | Graindorge | 356/387 |
| 5,008,556 | 4/1991 | Mersch | 250/560 |

FOREIGN PATENT DOCUMENTS

0320139 6/1989 European Pat. Off. ............ 356/382

Primary Examiner—David C. Nelms
Assistant Examiner—Michael Messinger
Attorney, Agent, or Firm—Oblon, Spivak, McClelland, Maier & Neustadt

[57] ABSTRACT

Method and device for the geometric characterization of transparent tubes. According to the invention, in order to characterize a transparent tube whose internal and external walls are approximately cylindrical and coaxial, the tube is placed in the air and scanned by an incident luminous beam moved parallel to it within a section plane perpendicular to the axis of the tube. Beams (F0, F1, F2, F3, F4) not deflected by the tube are detected. The detected beams, except for one which passes through the axis of the tube form two pairs. The distance between the two beams of each of these two pairs is determined, and, with the aid of these distances, the internal and external diameters of the tube at the level of the cutting plane are determined. Application for the geometric characterization of tubes for preforms for optical fibers.

12 Claims, 5 Drawing Sheets

METHOD AND DEVICE FOR THE GEOMETRICAL CHARACTERIZATION OF TRANSPARENT TUBES

FIELD OF THE INVENTION

The present invention concerns a method and device to geometrically characterize transparent tubes. In particular, it is applicable for the geometrical characterization of glass tubes made, for example, of silica, and intended for the production of preforms for optical fibers.

BACKGROUND OF THE INVENTION

There already exists a technique making it possible to determine the internal diameter and external diameter of a transparent tube. A technique whereby the external diameter of the tube is determined by means of a first measuring device and the thickness of said tube is determined by means of a second measuring device distinct from the first device, a knowledge of this thickness then makes it possible to determine the internal diameter of the tube.

This known technique using two devices is an expensive technique.

There also exists another technique making it possible to determine the internal diameter and external diameter of a transparent tube, this technique being implemented in a device sold by the YORK TECHNOLOGY company under the reference P101. According to this other technique, the internal diameter and external diameter of the tube are determined by means of optical index measurements and the tube needs to be placed in an index attachment liquid.

This other known technique is totally unsuited for the "continuous" measurement of the geometrical characteristics of an tube being produced which needs to run off in front of said device.

SUMMARY OF THE INVENTION

The object of the present invention is to overcome these drawbacks by proposing a method and device for the geometrical characterization of transparent tubes whose implementation is less expensive than that of the first known technique mentioned above and which are fully suitable for the "continuous" measurement of the geometrical characteristics of a tube in the course of production.

More precisely, the object of the present invention is firstly to provide a method for the geometrical characterization of a tube which is transparent to at least one light and whose internal and external walls are approximately cylindrical and coaxial, wherein the tube placed in the air is scanned by an incident beam of said light, a beam which moves parallel to it within a cutting plane perpendicular to the axis of the tube, the beams not deflected by the tube are detected, these beams, except for the last one which passes through the axis of the tube, working in pairs, the distance between the two beams of each of these two pairs being determined for two of these pairs and, with the aid of these distances, the internal diameter and external diameter of the tube at the level of said cutting plane are determined.

Of course, without departing from the context of the invention, it is possible to determine, not the internal and external diameters of the tube, but the internal radius and external radius of this tube.

Indeed, there is already known to exist, by virtue of an article by L. S. WATKINS and published in the journal APPLIED OPTICS, volume 18, No.13, Jul. 1, 1979, p. 2214-2222, a technique making it possible to determine the relationship of refraction indices and the gradient profile of a preform for optical fibers with an index gradient. However, this known technique completely differs from the method of the present invention. In fact, according to this known technique, measurements are carried out on preforms for index gradient optical fibers and not on tubes and the angles of deflection of luminous beams are measured, whereas in the present invention non-deflected luminous beams are used.

Furthermore, this known technique requires the use of an index attachment liquid, whereas in the present invention, the tube is placed in the air, which makes it possible to carry out measurements directly at the outlet of a glass tube production oven, for example.

According to one particular implementation of the method of the invention, the internal diameter and external diameter are determined in a plurality of cutting planes spaced from each other along the axis of the tube so as to geometrically characterize the tube inside these cutting planes.

According to another particular implementation, the tube is made to rotate around its axis and the external diameter of the tube is determined in said cutting plane at a plurality of points of the external wall of the tube situated inside this cutting plane.

This makes it possible to check that the external wall of the tube is "cylindrical", in other words to ensure, if the tube has a certain ovalization or out-of-round shape, that it does not exceed a limit fixed in advance.

According to another particular implementation, the tube is made to rotate around its axis, the space, possible existing between the internal diameter and the external diameter of the tube inside the cutting plane at a plurality of points of the tube situated inside this cutting plane, is determined, the tube being orientated so that the diametral plane of the tube, which contains the point corresponding to the minimum space, is perpendicular to a reference plane parallel to the incident beam and, for each of the two points of said diametral plane diametrical on the internal wall of the tube, the distance with respect to the reference plane of one of the non-deflected beams, which are reflected at least once to the air/internal wall interface, is determined, and, with the aid of the two distances thus obtained, determining the shift possibly existing between the axis of the internal wall and the axis of the external wall.

This makes it possible to verify the "coincidence" between the axis of the internal wall and the axis of the external wall of said tube, in other words to ensure that the space which might exist between these two axes is less than one value where it is fixed.

Like non-deflected beams, it is possible to use beams which are tangent to the external wall of the tube and, from amongst the other non-deflected beams, those which are reflected at least once to the air/internal wall interface.

The tube may be a glass tube intended for the production of a preform for optical fibers and whose internal wall is intended to be covered with a vitreous coating for the formation of the core of the optical fibers. It is then possible to geometrically characterize the tube in accordance with the method of the invention before and after forming of the vitreous coating on the internal wall.

The present invention also concerns a device to geometrically characterize a tube transparent to at least one light and whose internal and external walls are roughly cylindrical and coaxial, wherein said device includes:
  means for transmitting said light,
  means provided to scan the tube placed in the air by an incident luminous beam derived from said transmission means by moving this beam parallel to it within a cutting plane perpendicular to the axis of the tube,
  photodetection means provided to detect any beams not deflected by the tube, these beams, except for the last one which passes through the axis of the tube, working in pairs, and
  means provided to determine, for two of these pairs, the distance between the two beams of each of these pairs and, with the aid of these distances, to determine the internal diameter and external diameter of the tube at the level of said cutting plane.

According to one particular embodiment of the device of the invention, this device further includes means for the relative displacement of the tube with respect to the means provided to scan the tube and with respect to the photodetection means.

According to another particular embodiment, the device of the invention further includes means for rotating the tube around its axis.

Finally, in one particular embodiment of the device of the invention, the means provided to scan the tube include:
  a first convergent lens, one of its focal points being on the axis of the tube and whose optical axis is perpendicular to said tube axis,
  an oscillating mirror placed at the other focal point of the first lens and which receives the light from the transmission means, a second convergent lens with the same focal distance as the first one and being placed symmetrically from the latter with respect to the axis of the tube and so that its optical axis is merged with the optical axis of the first lens so that one of the focal points of the second lens is on the axis of the tube at the same point as said focal point of the first lens,
and wherein the photodetection means include an approximately punctual photodetector placed at the other focal point of the second lens.

BRIEF DESCRIPTION OF THE DRAWINGS

The present invention shall more readily be understood from a reading of the following description of embodiment examples, given purely by way of illustration and being in no way restrictive, with reference to the accompanying drawings in which:

FIG. 2B diagrammatically and partly illustrates the signals supplied by a photodetector forming part of the device represented on FIG. 1 in response to the non-deflected luminous beams.

FIGS. 3B and 3C diagrammatically illustrate one method conforming to the invention, FIG. 4 diagrammatically illustrates the path lengths of two of the non-deflected beams, one being tangent to the external wall of the tube and the other reflecting once onto the air/internal wall interface, FIG. 5 diagrammatically illustrates another non-deflected luminous beam which is reflected twice onto this air/internal wall interface and once to the air/external wall interface, FIG. 6 diagrammatically illustrates another non-deflected luminous beam which is reflected three times to the air/internal wall interface and twice to the air/external wall interface.

DETAILED DESCRIPTION OF THE PREFERRED EMBODIMENTS

Figure 1:
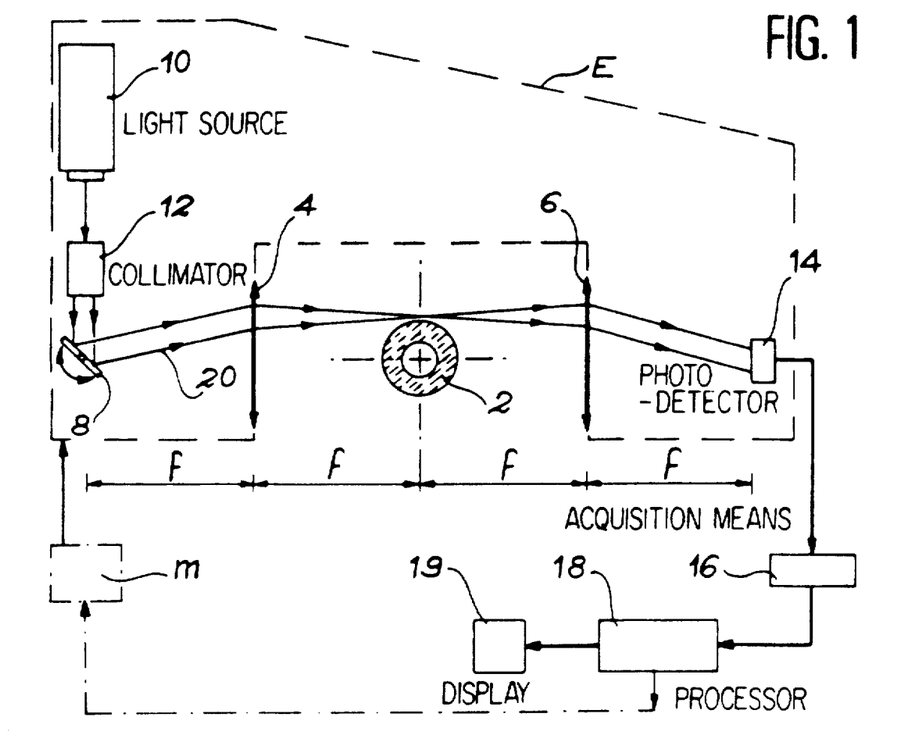
FIG. 1 is a diagrammatic view of a particular embodiment of the device of the invention, FIG. 2A diagrammatically illustrates the various non-deflected luminous beams used in the present invention.

FIG. 1 diagrammatically represents a particular embodiment of the device of the invention. This device is intended for the geometrical characterization of a transparent tube 2, made for example of silica, placed on a support device (not shown). The internal and external walls of the tube are approximately cylindrical and coaxial.

The device of FIG. 1 includes a first convergent lens 4 and a second convergent lens 6 identical to the first one. This concerns two single convergent lens having the same focal distance f. The optical axes of the lenses 4 and 6 are merged and perpendicular to the axis of the tube 2. In addition, the lenses 4 and 6 are both symmetrical with respect to the axis of the tube 2 and have a common focal point on this axis.

The device also includes a flat mirror 8 controlled by means (not shown) which make it rotate around a spin axis parallel to the axis of the tube 2, this spin axis being contained in the reflective flat face of the mirror 8. In addition, the oscillating mirror 8 is placed so that the other focal point of the lens 4 is on said reflective face and on the spin axis of the mirror.

The device also includes a light source 10, such as a laser, provided to send a luminous beam onto the oscillating mirror 8 by means of a collimator 12 provided to increase the diameter of the beam derived from the laser.

Finally, the device includes a photodetector 14, such as a receiving photodiode, which is approximately punctual, that is having a small aperture angle of about 2 milliradians, for example, means 16 for acquiring the electric signals supplied by the photodiode 14, electronic means 18 for processing the information thus acquired and means 19 for displaying the results obtained by the means 18. The receiving face of the photodiode 14 is placed on the other focal point of the lens 6 on the image (fixed) of the oscillating mirror 8.

The oscillating mirror 8 thus makes it possible to scan the tube 2 by a luminous beam which is in focus on the plane which passes through the axis of the tube and which is perpendicular to the optical axis common to the two lenses 4 and 6. The luminous beam which scans the tube moves parallel to it when the tube is being scanned.

The acquisition means 16 include, for example, an acquisition card which stores the image of a scanning of the tube and which is, for example, the type sold by the KEITHLEY company under the reference DSH 16F, and the processing means 18 include a computer, such as a JASMIN type computer, which, by means of the information stored in the acquisition card, determines the internal and external diameters of the tube 2, as shall be seen subsequently.

Purely by way of illustration and being in no way restrictive, in order to characterize a silica tube whose external diameter is less than 70 mm, the following is used: a He-Ne laser whose coherence makes it possible to have the tube scanned by a beam which, at the level of the tube, forms a luminous spot several micrometers in diameter with a scanning amplitude of about 70 mm, and lenses scarcely having any aberration which, as regards the lens 4, makes it possible to conserve the focussing quality of the laser with $f=100$ mm; the laser transmits a beam whose wavelength is 633 nm and which has a diameter of 0.8 mm; the size of the spot at the level of the tube is fixed at 20 micrometers (focal spot diameter), which requires that the luminous beam 20 falling onto the lens 4 has a diameter of about 4 mm, hence the need to use a collimator 12 which multiplies the diameter of the beam derived from the laser by 5.

The photodiode 14 only receives the light from the non-deflected beams at the crossing of the tube (and of course the light from the beams which pass above and below the tube and which; like said non-deflected beams, are in focus by means of the lens 6 on the photodiode). The beams reflected to the air/internal tube wall interface and refracted by the silica thickness of the tube inside an angle larger than the aperture angle of the photodiode are not "seen" by this photodiode.

During a scanning of the tube, only five beams are not deflected or reflected by this tube. These five beams are represented on FIG. 2A. These are: the beam F0 which passes through the axis of the tube, the beam F1 which comes out of the tube again after five reflections (three on the air/silica internal diopter and two on the air/silica external diopter), the beam F2 which comes out of the tube again after three reflections (two on the air/silica internal diopter and one on the air/silica external diopter), the beam F3 which comes out the tube again after one reflection on the air/silica internal diopter, and the beam F4 which is tangent to the external wall of the tube.

The "air/silica internal diopter" (respectively external) is understood to mean the interface between the internal (respectively external) wall of the tube and the air.

Figures 2A, 2B:
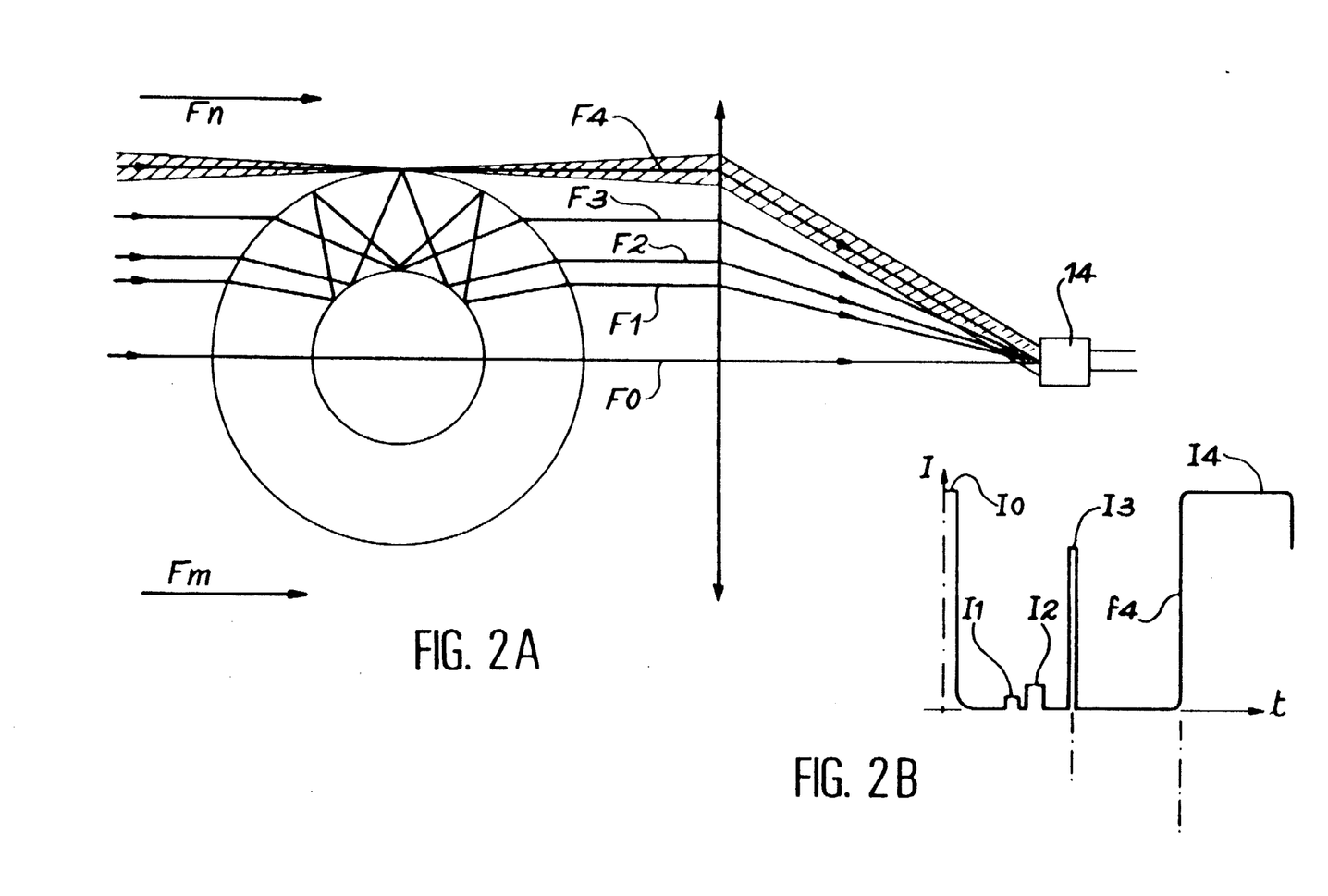

Two of the beams F1 to F4 are used to determine the internal radius r (or internal diameter 2r) of the tube and the external radius R (or the external diameter 2R) of the tube, for example the beam F4 which is simply linked to R, as shall be seen subsequently, and one of the beams F1, F2 and F3.

FIG. 2B shows the variations of the intensity I of the signal supplied by the photodiode 14 according to the time t during one scanning of the tube from the bottom to the top. It shall be observed that only one half of the curve I(t) is shown on FIG. 2B, this half corresponding to that part of the scanning which is limited on one side by the beam F0, and on the other by the last beam Fn of the scanning, which passes above the tube. FIG. 2A shows the other beam Fm which limits the scanning and which passes below the tube. Thus, scanning is limited by Fm and Fn and may range from Fm and Fn with return to Fm.

With reference to FIG. 2B, the latter shows from left to right an intense peak I0 corresponding to F0, an extremely low intensity peak I1 corresponding to F1, a peak I2 slightly more intense than the preceding peak and corresponding to F2, a peak I3 much more intense than I1 and I2 but slightly less intense than I0, this peak I3 corresponding to F3, and a strobe I4 whose intensity is roughly equal that of I0 and whose ascending front f4 corresponds to F4 and which is associated with the beams ranging from F4 to Fm.

There now follows an explanation as to how to determine the internal diameter 2r and external diameter 2R of the tube.

In considering a plane, called here a reference plane which contains the axis of the tube and the optical axis X common to the two lenses (FIG. 4), it can be seen that, during a scanning between the two beams Fm and Fn, two Fi type beams are in fact obtained, i ranging from 1 to 4. One of these two beams is situated on one side of the reference plane (see FIG. 2A), the other (not shown) of these two beams being situated on the other side of the reference plane.

As a result, the non-deflected beams work in pairs, except for the beam F0.

So as to calculate the quantities 2R and 2r, this is the reason why, for two of these pairs, a determination is made of the distance between the two beams of each of these two pairs.

For example, the two F3 type beams (one reflection onto the air/silica internal diopter) and the two F4 type beams (tangent to the external wall of the tube) are used.

During scanning of the tube between the limit beams Fm and Fn, the photodetector 14 supplies an analog signal $\gamma$ (in volts) according to the time t. The effective part of this signal is represented on FIG. 3A which shows the start t1 and end t2 of scanning, the peaks p1 and p2 corresponding to the two F3 type beams and the strobes c1 and c2 whose "fronts" correspond to the two F4 type beams. The dots correspond to the non-serviceable part of the signal U.

Figure 3A:
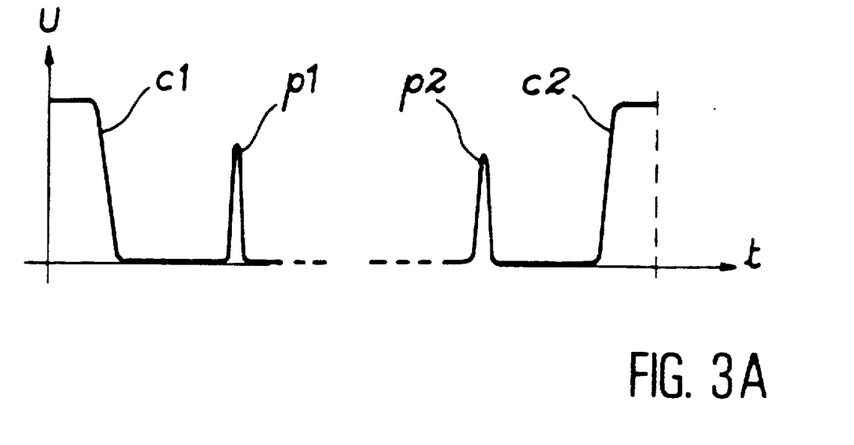
FIG. 3A illustrates some of these signals by considering only two of the non-deflected beams.

The spatial resolution Rs of this signal is given by the scanned length/spot diameter ratio, namely:

$$Rs = 60/(20.10^{-3}) = 3000 \text{ resolution "points"}$$

for the scanning of 60 mm with a spot of 20 micrometers.

The signal U is then stored on the DSH 16F acquisition card equipped on a JASMIN computer with an ordinate and abscissa resolution of 12 bits (4096 absciss points with, for each absciss, 4096 possible levels). Thus, in abscissa, the resolution of the memory does not penalize the intrinsic resolution of the laser.

Then there is a digital signal available. The units are arbitrary; each discrete absciss between 0 and 4096 has a discrete level between 0 and 4096.

The computer determines and stores four abscissae x1, x2, x3 and x4 in coincidence with a determined triggering threshold S by increasing by increments from 0 for the first two abscissae x1 and x2 and by decreasing by increments from 4096 for the other two abscissae x3 and x4.

Figure 3B:
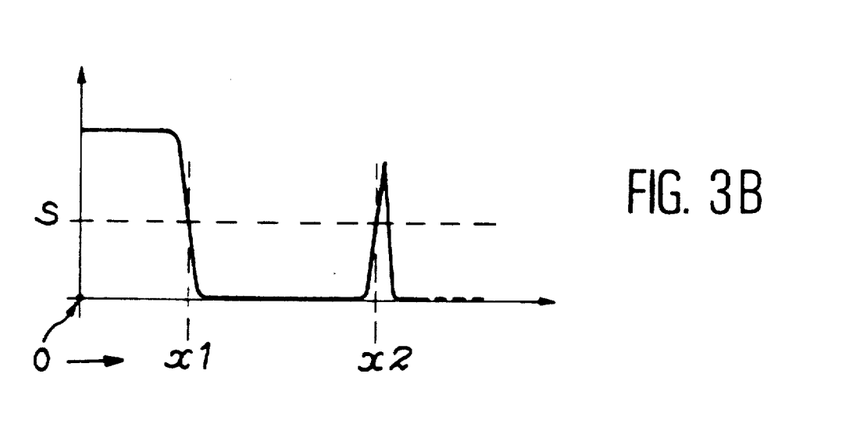
Figure 3C:
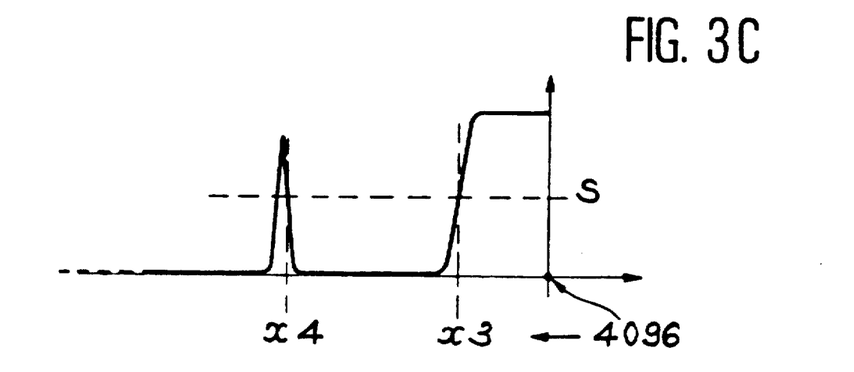

This is diagrammatically illustrated on FIGS. 3B and 3C showing the threshold S and the abscissae x1, x2, x3 and x4.

The external diameter 2R of the tube is proportional to the difference x3 − x1 and the internal diameter of the tube is calculated from the difference x4 − x2. These differences are stored.

The operation (scanning, storage) is carried out several times, such as eight, so as to obtain extreme precision.

Firstly, so as to convert the scale of abscissae into millimeters, a proportionality factor is determined with the aid of a tube with a known external diameter or a full cylinder with a known diameter (installed in the device of FIG. 1 before characterization of the tube 2) and this proportionality factor is stored in the computer.

On the basis of the differences stored and converted into mm, the computer calculates the external diameter 2R and the internal diameter 2r of the tube 2 by means of formulae specified hereafter for the eight measurements carried out. Then, the computer calculates the means or average of the eight "2R" values obtained and the average of the eight "2r" values obtained and displays the results.

Figure 4:
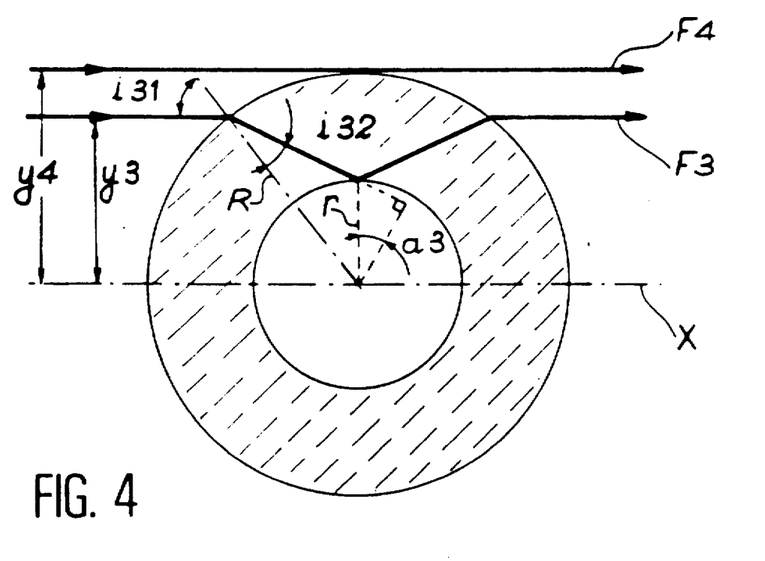
Figure 5:
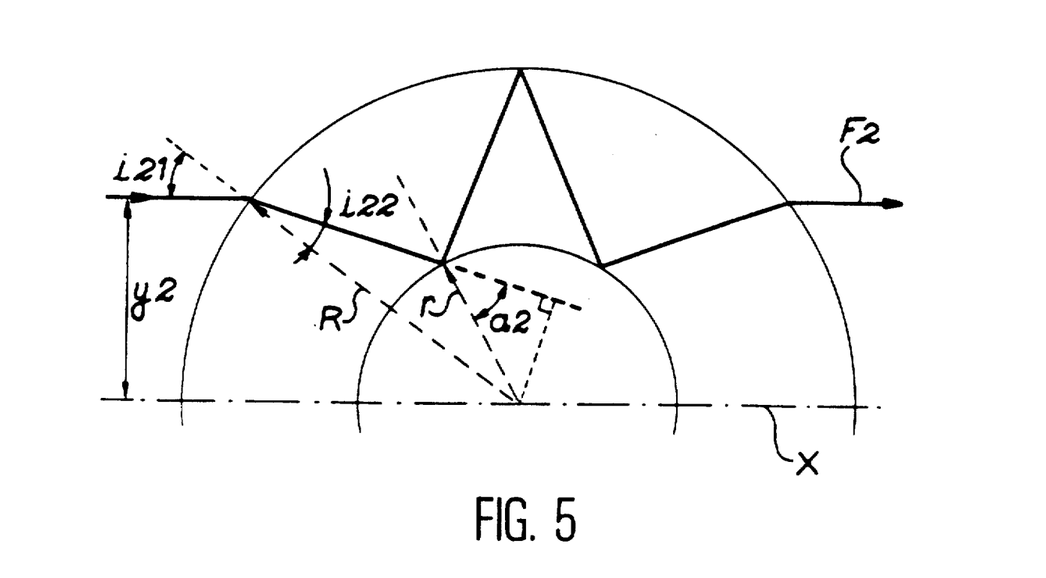
Figure 6:
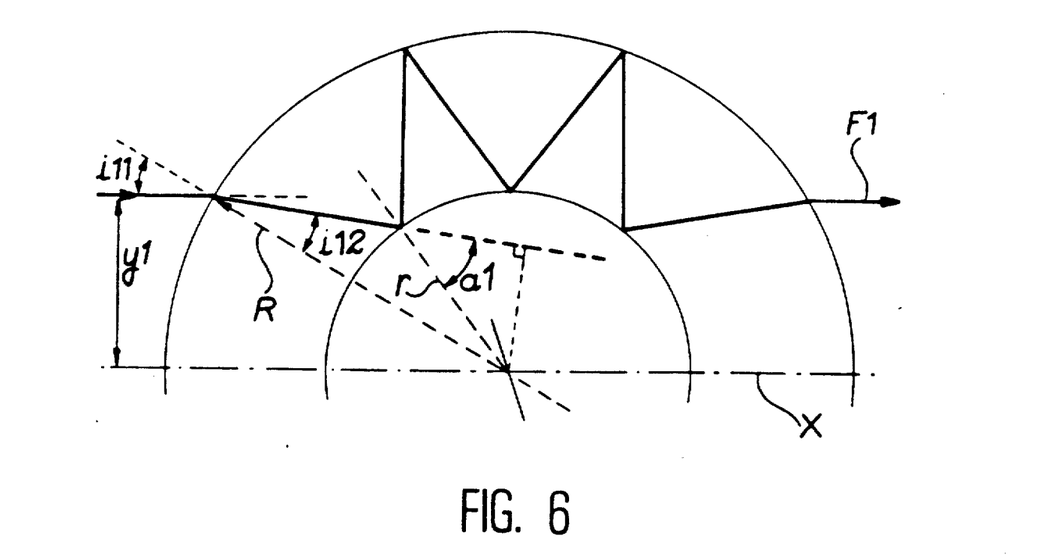

With reference to FIGS. 4 to 6, these figures mark the distance between each of the non-deflected beams F1 to F4 and the reference plane. These distances are respectively given the references y1 to y4 for the beams F1 to F4.

With reference more particularly to FIG. 4 showing the beams F3 and F4 and used in the previously mentioned method to determine the internal and external diameters, it can be clearly seen that 2R (proportional to x3 − x1) is equal to 2.y4 and that 2.y3 (proportional to x4 − x2) can be determined by using the angles i31, i32 and a3 indicated on FIG. 4:

$$a3 = i31 - i32$$

$$y3 = n.r. \cos(a3)$$

The following is deduced:

$$r = y3.n^{-1}.(1 - \frac{1}{2}(\text{Arcsin}(y3/R) - \text{Arcsin}(y3/(nR)))^{2-1})$$

a formula in which n represents the optical index of the material constituting the tube (the silica in the example in question).

Instead of using the two F3 type beams, it is possible to use the two F2 type beams (FIG. 5). With the aid of the angles i21, i22 and a2 indicated on FIG. 5, the following can be written:

$$a2 = pi/4 - i2\frac{1}{2} + i22$$

$$y2 = n.r. \sin(a2)$$

The following are deduced:

$$r = y2.n^{-1}.(\sin(pi/4\frac{1}{2} \text{Arcsin}(y2/R) + \text{Arcsin}(y2/(nR))))^{-1}.$$

In the above formula pi represents a well recognized number being about 3.1416.

Instead of using the two F3 type beams, it is also possible to use the two F1 type beams (FIG. 6). With the aid of the angles i11, i12 and a1 indicated on FIG. 6, the following can be written:

$$a1 = pi/6 - i1\frac{1}{2} - i12$$

$$y1 = n.r. \sin(a1)$$

The following is deduced:

$$r = y1.n^{-1}.(\sin(pi/6\frac{1}{2} \text{Arcsin}(y1/R) + \text{Arcsin}(y1/(nR))))^{-1}.$$

It shall be observed that the thinner the tube is, the more y3 draws close to R, the more difficult it is to separate y3 and I4 (FIG. 3) and the more difficult it is to determine r. It is thus advantageous to use the F1 type beams, that is 2.y1, or the F2 type beams, that is 2.y2 for the characterization of thin tubes.

Figure 7:
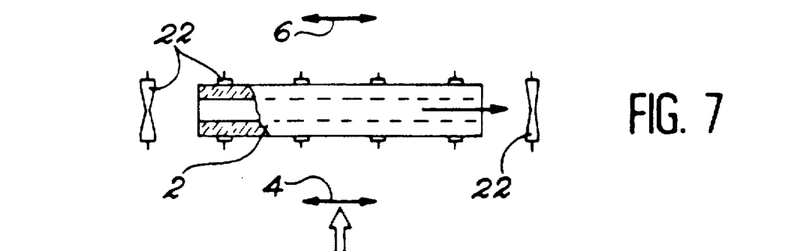
FIG. 7 diagrammatically illustrates the means for transmission of the tube, which may be provided with the device diagrammatically represented on FIG. 1, FIG. 8 diagrammatically illustrates the means for rotating the tube around its axis, which may also be provided with this device of FIG. 1, FIG. 9 diagrammatically illustrates two non-reflected luminous beams able to be used to determine any possible space existing between the axis of the internal wall and the axis of the external wall of the tube, and FIGS. 10A, B and C diagrammatically illustrates the out-of-round shape and said space between the axes the tube may possibly exhibit.

The determination of 2R and 2r may be effected at several levels of the tube 2. To this effect, it is possible to move the tube in translation between the two lenses 4 and 6 parallel to the axis of the tube by means of suitable devices 22, such as a race which allows for translation of the tube whilst the latter is being held up (FIG. 7).

As a variant, the tube is fixed and the measuring unit E (FIG. 1), comprising the laser 10, the collimator 12, the oscillating mirror 8, the lenses 4 and 6 and the photodetector 14, is moved in translation parallel to the axis of the tube.

The displacement of the unit E may be controlled by a motor m, itself controlled by the computer 18 which gives the order to the motor m, once the measurements in a cutting plane are completed, to move in translation the unit E by one pitch or step so as to carry out the measurements in the immediately next cutting plane.

Figure 8:
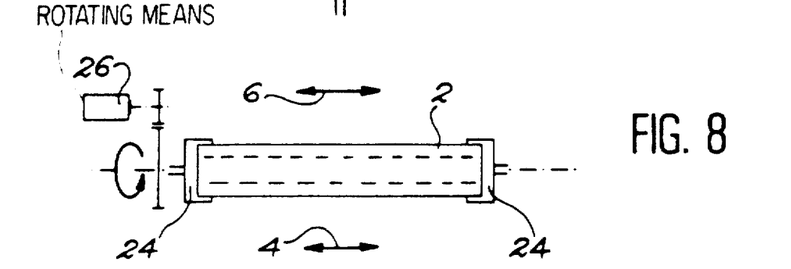

As shall be seen subsequently, it may be necessary to have the tube rotate around its axis between the two lenses 4 and 6. To this effect, two clamping jaws 24 (FIG. 8) can be used to hold the tube and is driven by a movement of rotation around the axis of the tube by appropriate means 26.

According to the invention, it is possible to control the internal radius (or diameter) and external radius (or diameter) of the tube so as to to ensure that they both have acceptable values and this control may be effected for one or several transversal tube sections.

In certain cases, it may also be necessary to ensure that the tube is fully "cylindrical", that is to ensure, for one or several transversal sections in each of the latter, that the quantity R fluctuates within a narrow interval where it is fixed.

It may also be necessary to check that the internal and external walls of the tube are genuinely "coaxial", that is of checking that the space between the axis of the external wall of the tube and the axis of the internal wall of the tube is smaller than a small value fixed in advance.

This is certainly true for a silica tube intended for the production of a preform for optical fibers and as regards the internal wall where a vitreous coating is deposited intended for the formation of the core of the optical fibers. It is important to geometrically characterize such a tube before and after depositing the vitreous coating, as a tube with poor geometric characteristics would provide poor optical fibers.

In order to make this characterization, given the fact that a silica tube has just been machined, first of all it is necessary to ensure that the external wall is truly cylindrical. It merely suffices that the corresponding control is made at one tube extremity or possibly at its two extremities. Furthermore, having regard to the method to produce such a silica tube, if the external wall is effectively cylindrical, then it is certain that the same applies for the internal wall.

Then a check is made to ensure the coaxiality of the internal and external walls of the tube. It merely suffices to carry out a check at one tube extremity or possibly at the two tube extremities.

Finally, if the two preceding checks (cylindrical external wall and coaxiality of walls) give acceptable results, R, r and R-r is checked in several tube transversal sections at, for example, every 10 mm for a tube 600 mm long.

If one of the afore-mentioned checks gives poor results, it is necessary to machine the tube again so as to correct its geometrical defects.

The same checks are made after having deposited the internal vitreous coating and a check is then also made of the thickness of the deposited coating, this latter check being carried out in several tube transversal sections spaced regularly from each other along the length of the silica tube.

The method for producing this tube is effected in such a way that if there is any tube ovalization, this ovalization occurs identically on both the internal and external walls. It is therefore possible to carry out ovalization measurements on the external wall of the tube and use the internal wall to carry out offset measurements (space between the respective axes of the internal wall and external wall).

So as to ensure that the external wall is cylindrical, the tube is made to rotate step-by-step around its axis and, at each step, the quantity 2.y4 is determined. If all the quantities 2.y4 thus determined are contained within a narrow interval fixed in advance, the external wall is regarded as being cylindrical.

Figure 9:
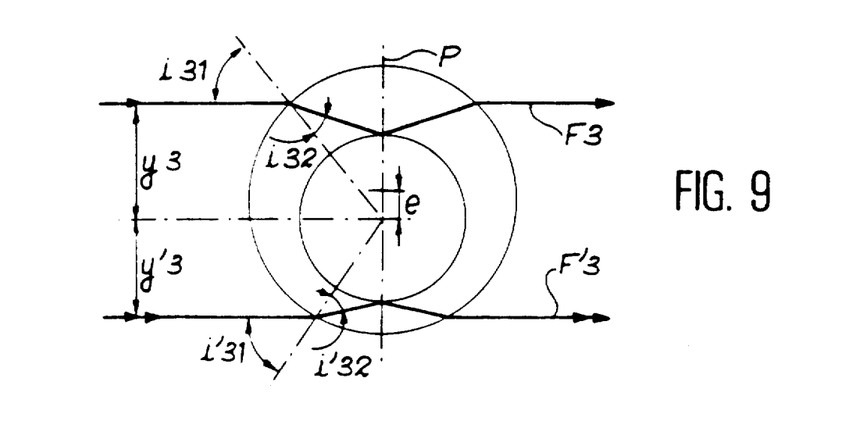
Figure 10A:
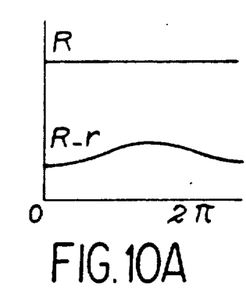
Figure 10B:
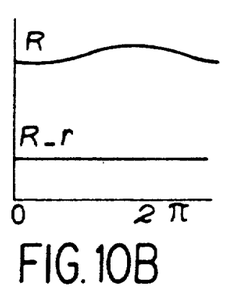
Figure 10C:
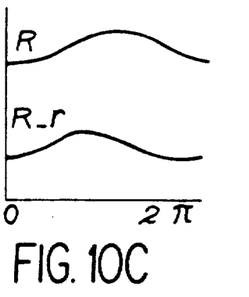

The offset measurement is explained on FIG. 9 and FIG. 10 shows how the external radius R and the thickness R-r of the tube vary for one complete rotation of this tube in the case (A) of a single offset, the case (B) of a single ovalization and in the case (C) of an ovalization associated with one offset.

Referring again to FIG. 9, so as to carry out offset measurements, the tube is made to rotate step-by-step around its axis and on each step R, r and then R-r are determined. Then, the minimum of the quantities R-r thus obtained is determined and the tube is disposed in such a way that the diametral plane (FIG. 9) corresponding to this minimum is perpendicular to the optical axis X of the lenses. Then in this position, the quantity y3 corresponding to the beam F3 relating to the upper part of the tube and the homologous quantity y'3 corresponding to the beam F'3, homologous to F3 (one single reflection to the air/internal wall interface) but relating to the lower part of the tube (see FIG. 9), are both determined.

By noting the offset as e, the following can be written:

$$r + e = y3 \cdot n^{-1} \cdot (\cos(i31 - i32))^{-1}$$

$$r - e = y'3 \cdot n^{-1} \cdot (\cos(i'31 - i'32))^{-1}$$

The angles i31, i32, i'31 and i'32 are indicated on FIG. 9 and the cosines are able to be calculated (see the description relating to FIG. 4). By adding link-by-link the two equalities listed above, the internal diameter of the tube is obtained, and by subtracting them link-by-link, obtaining double the offset e.

What is claimed is:

1. A device for the geometrical characterization of a tube which is transparent to at least one light and whose internal and external walls are substantially cylindrical and coaxial, wherein said device includes:
   emission means for emitting said light,
   means for scanning the tube with an incident light beam from said emission means by moving said incident beam parallel to itself in a section plane perpendicular to the axis of the tube;
   photodetection means for detecting the beams resulting from the scanning and not deflected by the tube, said beams not deflected by the tube, except for one which passes through the axis of the tube, forming pairs; and
   means for determining for two of said pairs respective distances between the two beams of each of said pairs and for determining, based upon said respective distances between the two beams of each of said pairs the internal diameter and external diameter of the tube, or the radii respectively corresponding to the diameters, at the level of said section plane.

2. The device according to claim 1, further comprising means for the relative displacement of the tube with respect to the means for scanning said tube, and with respect to the photodetection means.

3. The device according to claim 1, further comprising means for rotating the tube around its axis.

4. The device according to claim 1, wherein the means for scanning the tube include:
   a first convergent lens one focal point of which is on the axis of the tube and whose optical axis is perpendicular to said axis of the tube;
   an oscillating mirror placed at the other focal point of the first lens and which receives the light from the emission means;
   a second convergent lens having the same focal distance as the first convergent lens and place symmetrically from the first convergent lens with respect to the axis of the tube in such a way that its optical axis is merged with the optical axis of the first lens so that one of the focal points of the second lens is on the axis of the tube at the same point as said focal point of the first lens; and
   wherein the photodetection means include an approximately punctual photodetector placed at the other focal point of the second lens.

5. A method for geometrically characterizing a tube transparent to at least one light, and whose external walls are substantially cylindrical and coaxial, comprising the steps of:
   scanning said tube with an incident beam of light, said incident beam being moved parallel to itself in a section plane perpendicular to the axis of said tube;
   detecting incident light beams resulting from said scanning which are not deflected by said tube, said beams not deflected by said tube forming pairs, except for an incident beam passing through the axis of said tube;
   determining, for two of said pairs, the distance between the two detected beams of each of said two pairs; and
   determining, at the level of said section plane, at least one of the internal diameter and external diameter of the tube, or at least one of the radii respectively corresponding to the internal diameter and external diameter, based upon said distances determined between said two beams of said two pairs.

6. The method according to claim 5, wherein the step of scanning said tube is carried out in a plurality of section planes spaced from each other along the axis of the tube, and the step of determining at least one of the internal diameter and external diameter of the tube, or the radii respectively corresponding to the internal and external diameter, is carried out in the plurality of section planes.

7. The method according to claim 5, further comprising the step of rotating the tube around its axis and wherein the determining step comprises determining the external diameter of the tube, or the radius corresponding to the external diameter, in the section plane at a plurality of points along the external wall of the tube, said points being situated in the section plane.

8. The method according to claim 5, further comprising the step of rotating the tube around its axis, and wherein the determining step further comprises determining a space possibly existing between the internal diameter and external diameter of the tube in the section plane at a plurality of points along the tube situated in the section plane, wherein the tube is orientated in such a way that the diametral plane of the tube, which contains a point corresponding to a minimum space between said internal diameter and said external diameter, is perpendicular to a reference plane parallel to the incident beam for each of two points of said diametral plane which are diametrically opposed on the internal wall of the tube, and wherein the distance between the reference plane and one of the non-deflected beams which are reflected at least once at an air/internal wall interface is determined and based upon the two distances thus obtained, a shift possibly existing between an axis of the internal wall and an axis of the external wall is determined.

9. The method according to claim 5, wherein the non-deflected beams detecting during said detecting step comprise beams which are tangent to the external wall of the tube and non-deflected beams which are reflected at least once at the air/internal wall interface of the tube.

10. The method according to claim 5, wherein the tube comprises a glass tube which is intended for the production of a preform for optical fibers and whose internal wall is intended to be coated with a vitreous coating for the formation of the core of the optical fibers, and the tube is geometrically characterized before and after formation of the vitreous coating on the internal wall.

11. The method according to claim 5, wherein said scanning step is performed in air.

12. The device according to claim 1, wherein the means for scanning the tube scans the tube in air.

* * * * *